April 28, 1936. S. RUHLAND 2,038,906
GLARE SHIELD
Filed Oct. 29, 1934
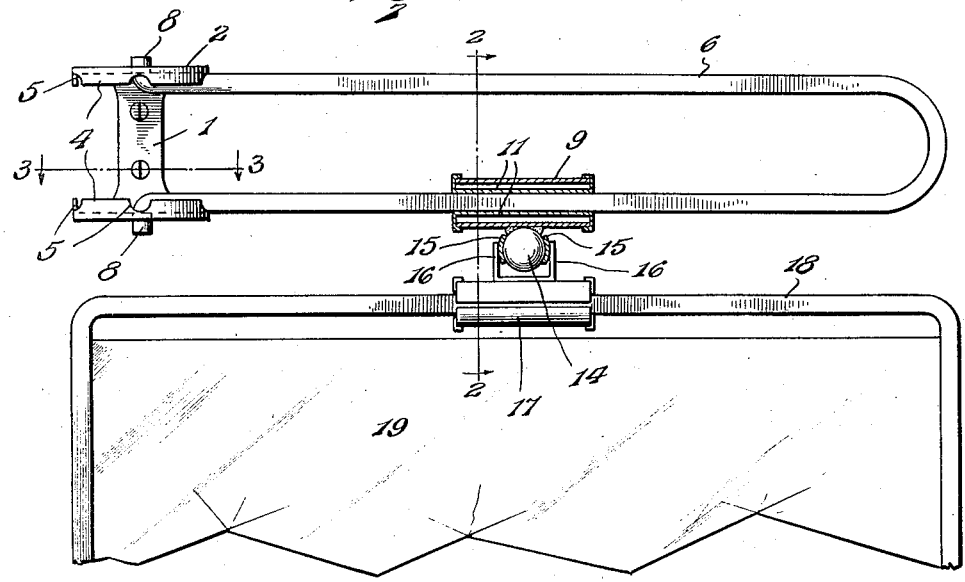
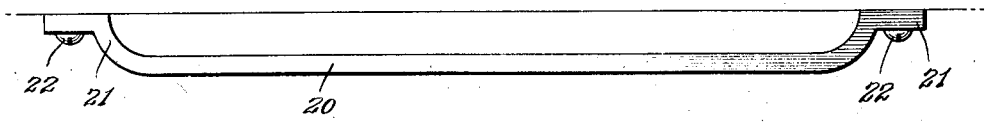
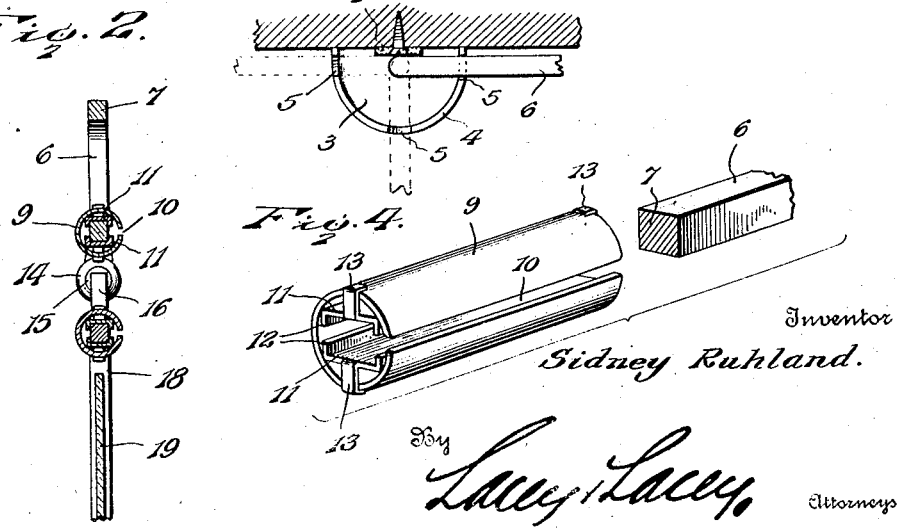
Inventor
Sidney Ruhland.
By Lacey & Lacey
Attorneys

UNITED STATES PATENT OFFICE 2,038,906

GLARE SHIELD

Sidney Ruhland, New York, N. Y.

Application October 29, 1934, Serial No. 750,575

6 Claims. (Cl. 296—97)

The object of this invention is to provide a device which may be readily mounted within a motor vehicle and adjusted in any desired position to protect the eyes of the chauffeur from the glare of a low sun or from approaching headlights. The invention is illustrated in the accompanying drawing and consists in certain novel features which will be particularly defined in the claims following a detailed description.

In the drawing:

Figure 1 is an elevation, partly in section, of a device embodying the present invention.

Figure 2 is a section on the line 2—2 of Figure 1.

Figure 3 is a section on the line 3—3 of Figure 1.

Figure 4 is a detail perspective view of a slide forming an element of the glare shield support.

Figure 5 is a detail view showing a stationary bracket.

In carrying out the invention, there is provided a bracket 1 which is adapted to be secured upon the windshield frame of a motor vehicle just above the windshield, and is provided at its upper and lower ends with arcuate extensions 2 and 3, each having a flange 4 along its arcuate edge and said flanges being provided with notches 5, as shown. There is also provided a U-shaped holding frame 6, the arms of which are non-circular in cross section, as shown clearly at 7 in Figures 2 and 4, and the extremities of the arms are somewhat resilient so that they may be readily engaged between and held by the plates of the bracket 1. The side arms of this holding frame are turned laterally to form studs 8 which are engaged through openings provided therefor in the upper and lower plates 2 and 3 of the bracket, as shown in Figure 1, whereby the frame will be pivotally supported and carried by the bracket. The side arms are adapted to engage in the notches 5 so that the frame will be held in a position against the frame of the vehicle or windshield or at an angle thereto, as will be readily understood upon reference to Figure 3. Mounted upon the lower arm of the suspending frame 6 is a sleeve 9 which is longitudinally split, as shown at 10, whereby it will be rendered somewhat resilient. Disposed within and secured to the sleeve 9 are mating jaws 11 adapted to slidably engage the arm of the frame and these jaws have side flanges 12 whereby they will be prevented from relative rocking movement upon the arms but may slide along the same. The jaws are preferably resilient so that they will frictionally engage the arm and be thereby held in a set position. Each jaw is provided with a tongue 13 at each end which extends radially outward and is bent over and secured upon the end of the sleeve 9. A ball 14 is secured to the under side of the sleeve 9 and is engaged by diametrically opposite shallow cup-like jaws 15 at diametrically opposite points, said cups being carried by and held to the ball by resilient tongues 16 secured to and rising from a lower sleeve 17 which encircles the upper bar 18 of a frame in which is fitted the glare shield 19. The sleeve 17 corresponds in all essential respects to the sleeve 9 and has housed therein angular mating resilient jaws which will frictionally engage and slide upon the frame 18 in which the glare shield is mounted. The glare shield may be of any suitable or preferred material and is illustrated as being composed of tinted glass or other translucent material so that, while the eyes of the chauffeur will be protected from strong glaring light, they will not be clouded to such an extent that a view of the road will be cut off.

From the foregoing description, taken in connection with the accompanying drawing, it will be seen that I have provided an exceedingly simple structure in which the glare shield may be readily mounted upon the vehicle and set in any desired position. The sleeves are shiftable longitudinally along the frames upon which they are respectively mounted and their frictional engagement with the frames will hold them in the position in which they may be set, while the ball and cup connection between the two sleeves constitutes a universal joint which will permit the shield to be set in any desired angular relation to the suspending frame. By slightly compressing or springing the sides of the hanger frame toward each other they may be withdrawn from the main supporting bracket and the device then set aside if its use is not desired. Likewise the glare shield may be separated from the hanger frame by exerting sufficient pressure upon the cups 15 to disengage them from the ball 14 so that when the device is not in use it may be stored in a very small space. The parts may be just as easily reengaged when it is thought the use of the shield may be desired.

When the range of adjustment provided by the mounting shown in Figure 1 is deemed unnecessary, the bracket shown in Figure 5 may be employed. This bracket consists of a flat-sided bar 20 having its ends offset, as at 21, and provided with openings through which fastening screws 22 may be inserted into the body of the vehicle in front of the driver. The split sleeve 9 is mounted on the rod and may be set at any point in the length thereof.

Having thus described the invention, what is claimed as new is:

1. A glare shield apparatus comprising a supporting bracket having upper and lower plates provided with opposed flanges each having a series of notches therein, a hanger frame having resilient terminals pivotally engaged in the bracket and adapted to seat in the notches in the flanges thereof, a glare shield and frame disposed below the hanger frame, and adjustable coupling means engaged with the glare shield frame and the hanger frame.

2. A glare shield apparatus comprising a hanger frame, a glare shield and glare shield frame below the hanger frame, said frames being non-circular in cross section, resilient sleeves encircling the respective frames, jaws carried within the sleeves and frictionally engaging the respective frames whereby they may be adjusted along the frame and held in a set position, a ball fixed on one of the sleeves, cups engaging the ball at diametrically opposite points thereof, and resilient tongues on the other sleeve carrying said cups.

3. A device of the class described comprising a hanger frame having means for pivotal connection with a support and adjustable laterally with respect to said support, upper and lower sleeves, one of which is slidably mounted on the hanger frame, a universal connection between the sleeves, a glare shield carrying frame slidably mounted for longitudinal movement within the lower sleeve, and means disposed within the sleeves and adapted to frictionally engage the adjacent frames for holding the said sleeves in a fixed position thereon.

4. A glare shield apparatus comprising an elongated hanger frame, a glare shield and glare shield frame disposed below the hanger frame, said frames having bars non-circular in cross section and spaced from each other, sleeves slidably encircling the bars of said frames, gripping members disposed within the sleeves and frictionally engaging the bars of the respective frames, and a universal joint connecting the sleeves, said glare shield frame being adjustable longitudinally within the cooperating sleeve independently of the hanger frame.

5. A device of the class described comprising a hanger frame, a glare shield carrying frame, a sleeve slidably mounted on each of said frames for adjustment longitudinally thereof, and a universal joint directly connecting one sleeve to the other, the glare shield carrying frame being adjustable longitudinally within one sleeve without disturbing the position of the other sleeve relative to the hanger frame.

6. A device of the class described comprising a hanger frame, upper and lower sleeves extending longitudinally of said frame, the upper sleeve being slidably mounted on the hanger frame for adjustment longitudinally thereof, a glare shield carrying frame slidably mounted within the lower sleeve and slidable longitudinally therethrough for adjustment longitudinally of the hanger frame independently of the upper sleeve, a universal joint directly connecting said sleeves to each other whereby to permit tilting movement of the glare shield carrying frame with respect to the hanger frame, and means carried by said sleeves for engaging the adjacent frames and holding the sleeves in adjusted positions.

SIDNEY RUHLAND.